(12) United States Patent
Croak et al.

(10) Patent No.: US 7,899,159 B1
(45) Date of Patent: Mar. 1, 2011

(54) METHOD AND APPARATUS FOR PROVIDING IN COUNTRY PHONE NUMBERS AND ROUTING RULES

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1430 days.

(21) Appl. No.: 11/263,275

(22) Filed: Oct. 31, 2005

(51) Int. Cl.
*H04M 11/00* (2006.01)

(52) U.S. Cl. .......................... 379/45; 379/37
(58) Field of Classification Search .............. 379/45, 379/37; 455/404.1
See application file for complete search history.

(56) References Cited

U.S. PATENT DOCUMENTS

| | | | |
|---|---|---|---|
| 2002/0160815 A1* | 10/2002 | Patel et al. | 455/404 |
| 2004/0185824 A1* | 9/2004 | Cheng | 455/404.2 |
| 2005/0169248 A1* | 8/2005 | Truesdale et al. | 370/352 |
| 2006/0182029 A1* | 8/2006 | Kealy et al. | 370/352 |

* cited by examiner

*Primary Examiner*—Stella L Woo

(57) ABSTRACT

A method and apparatus for providing a common database to store regionalized and localized dialing plans and emergency contact information of major international countries and cities around the world are disclosed. This database collects feeds from foreign network service providers and other carriers that provide regional and local support around the world on a periodic basis. This database is designed to provide the collected information to retail or wholesale network services providers as an information service.

17 Claims, 4 Drawing Sheets

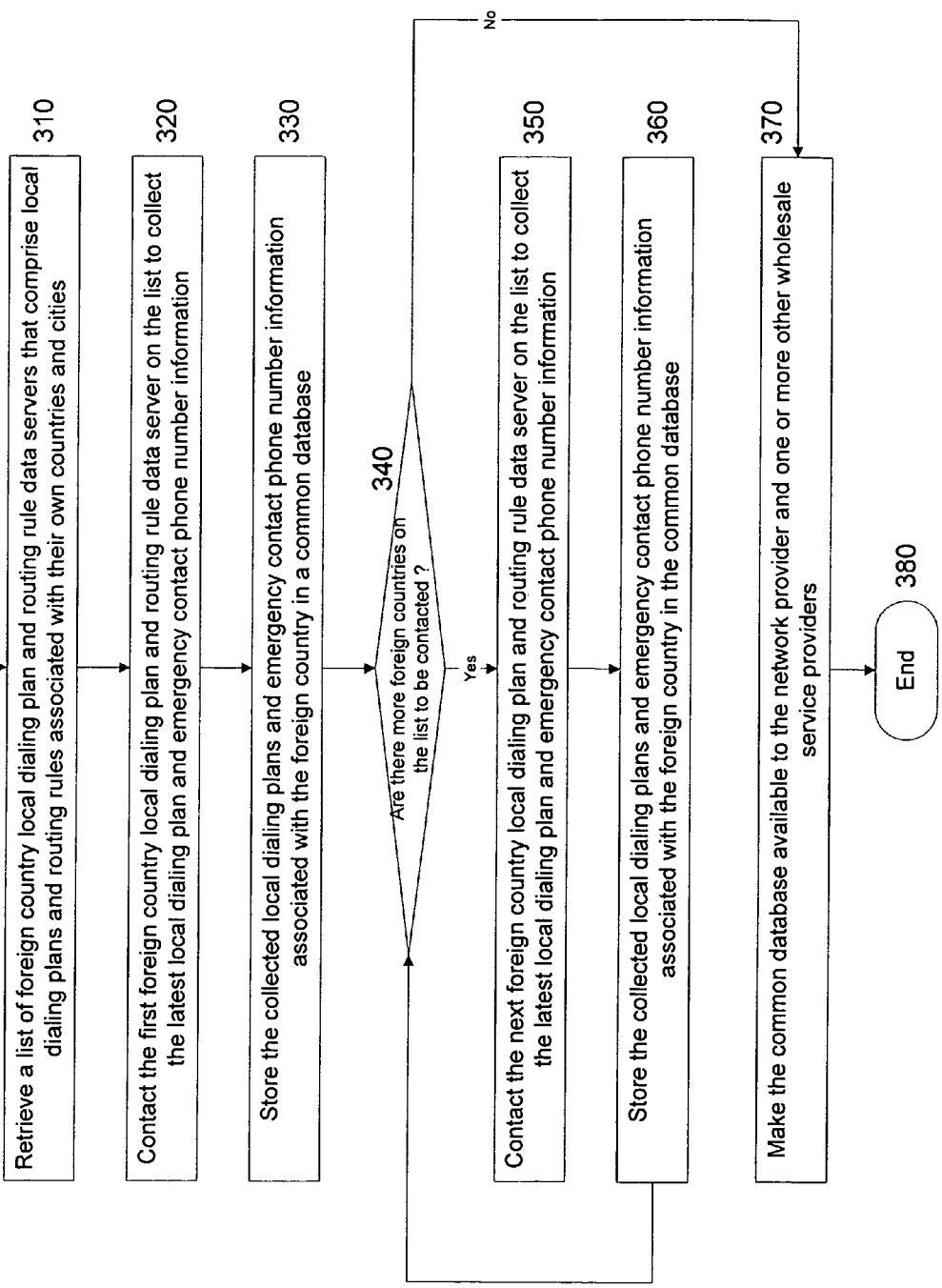

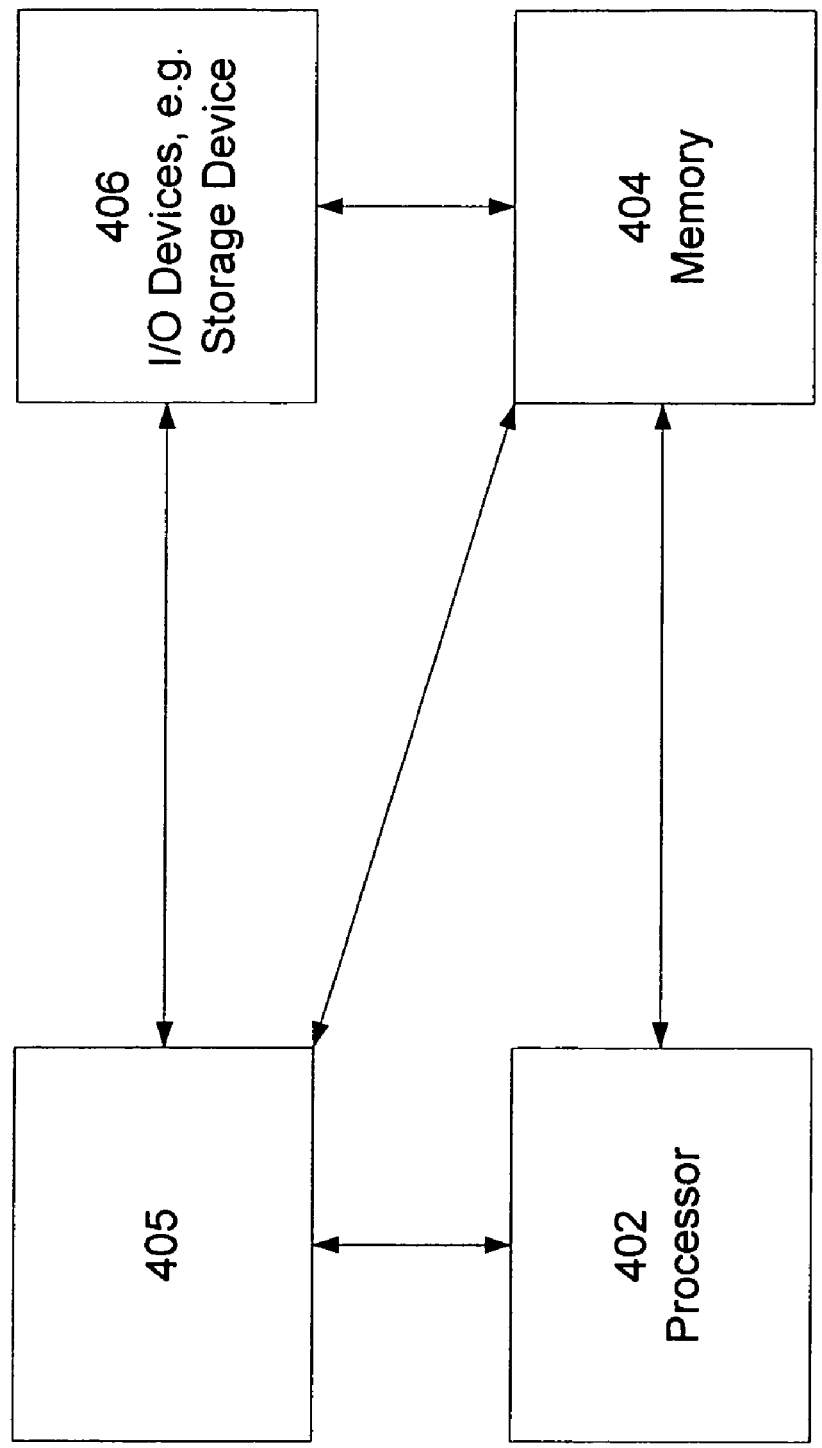

METHOD AND APPARATUS FOR PROVIDING IN COUNTRY PHONE NUMBERS AND ROUTING RULES

The present invention relates generally to communication networks and, more particularly, to a method and apparatus for providing in country phone numbers and routing rules in a common database in communication networks, e.g., packet networks such as Voice over Internet Protocol (VoIP) networks.

BACKGROUND OF THE INVENTION

Providers of international VoIP services are beginning to provide in country support for local calling features of foreign countries. This requires the network providers to know the characteristics of local dialing plans and features such as emergency dialing numbers for hundreds of locales for the supported foreign countries. For instance, in the foreign city, such as Hong Kong of China, the local dialing plan uses 8 digit phone numbers and the emergency service phone number is 999. The local dialing plans and the local emergency phone numbers vary from country to country or even from city to city within a country.

Therefore, a need exists for a method and apparatus for providing in country phone numbers and routing rules in a common database in a packet network, e.g., a VoIP network.

SUMMARY OF THE INVENTION

In one embodiment, the present invention creates a common database to store regionalized and localized dialing plans and emergency contact information of major international countries and cities around the world. This database collects feeds from public network service providers and other carriers that provide regional and local support around the world on a periodic basis. This database is designed to provide the collected information to retail or wholesale network services providers as an information service.

BRIEF DESCRIPTION OF THE DRAWINGS

The teaching of the present invention can be readily understood by considering the following detailed description in conjunction with the accompanying drawings, in which:

FIG. 3 illustrates a flowchart of a method for providing in country phone numbers and routing rules in a common database in a packet network, e.g., a VoIP network, of the present invention; and FIG. 4 illustrates a high level block diagram of a general purpose computer suitable for use in performing the functions described herein.

To facilitate understanding, identical reference numerals have been used, where possible, to designate identical elements that are common to the figures.

DETAILED DESCRIPTION

Figure 1:
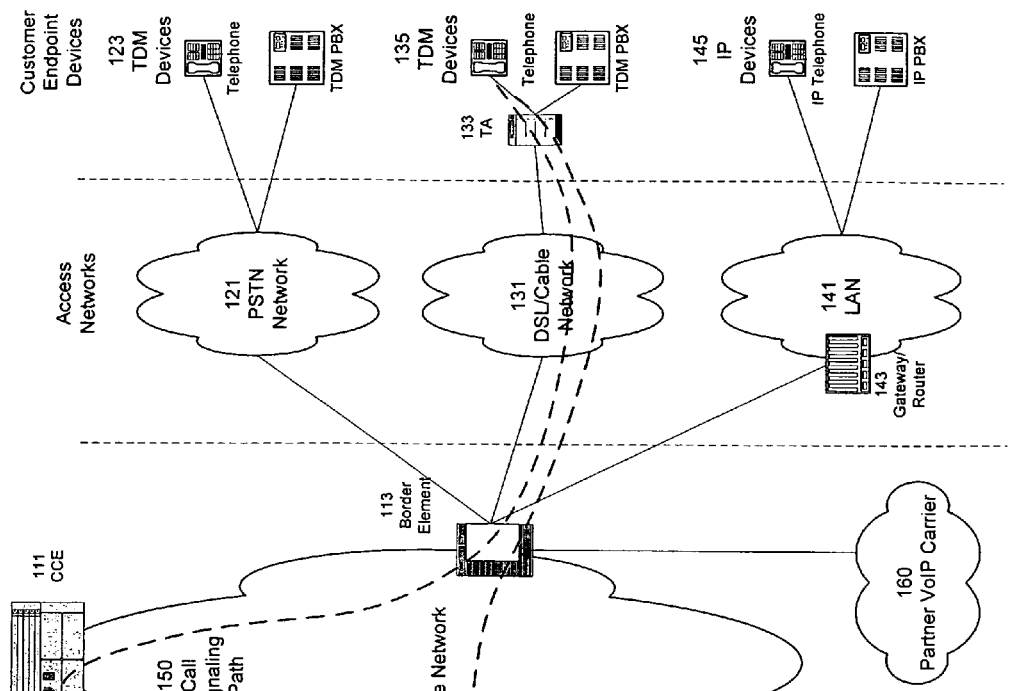
FIG. 1 illustrates an exemplary Voice over Internet Protocol (VoIP) network related to the present invention.
Figure 1:
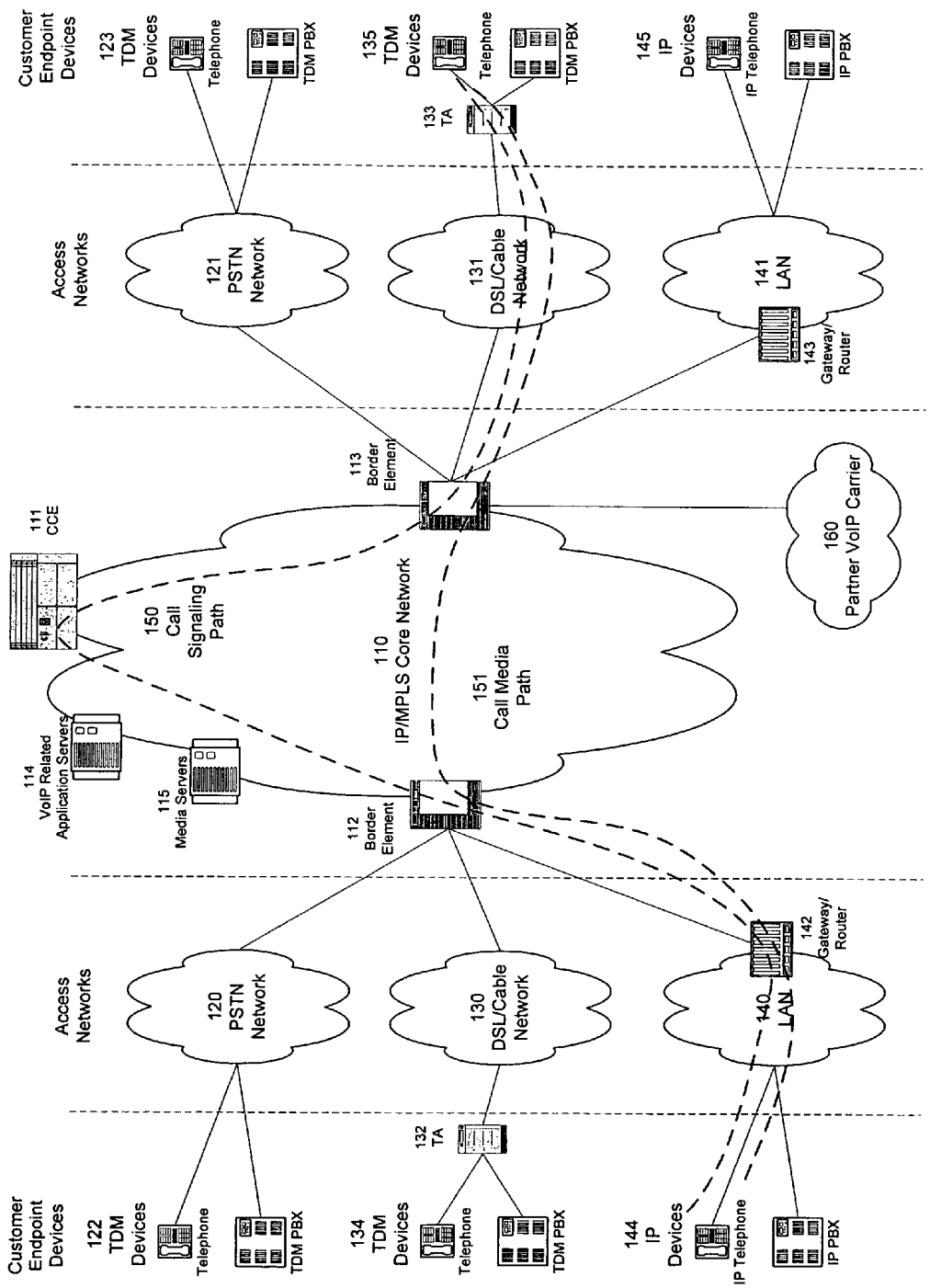

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Providers of international VoIP services are beginning to provide in country support for local calling features of foreign countries. This requires the network providers to know the characteristics of local dialing plans and features such as emergency dialing numbers for hundreds of locales for the supported foreign countries. For instance, in the foreign city, such as Hong Kong of China, the local dialing plan uses 8 digit phone numbers and the emergency service phone number is 999. The local dialing plans and the local emergency phone numbers vary from country to country or even from city to city within a country.

To address this need, the present invention creates a common database to store regionalized and localized dialing plans and emergency contact information of major international countries and cities around the world. This database collects feeds from public network service providers and other carriers that provide regional and local support around the world on a periodic basis. This database is designed to provide the collected information to retail or wholesale network services providers as an information service.

Figure 2:
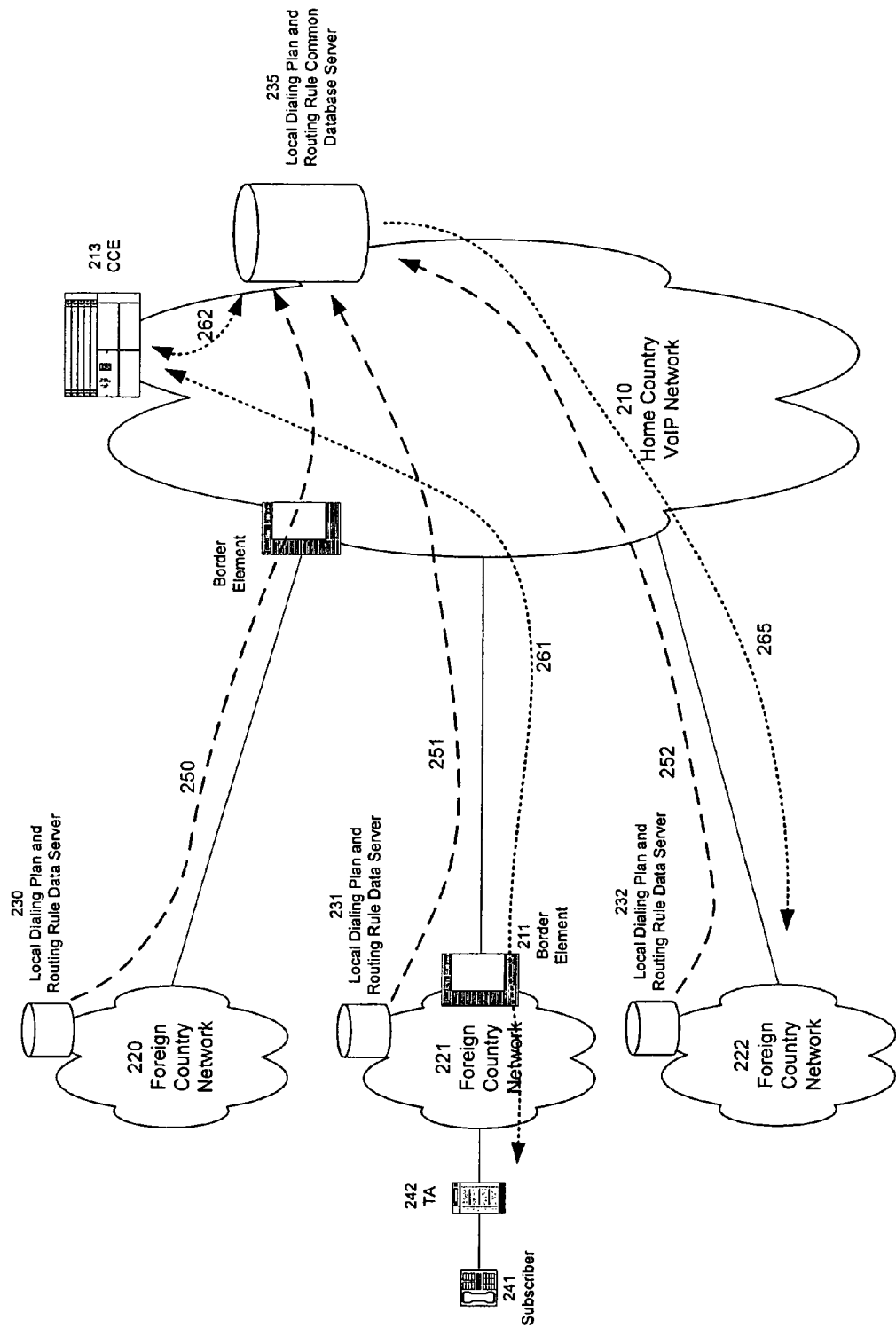
FIG. 2 illustrates an example of providing in country phone numbers and routing rules in a common database in a VoIP network of the present invention.

FIG. 2 illustrates an example 200 of providing in country phone numbers and routing rules in a common database in a packet network, e.g., a VoIP network of the present invention. In FIG. 2, the network provider of Home Country VoIP network 210 supports the Local Dialing Plan and Routing Rule Common Database Server 235 to provide an information service to other retail and wholesale VoIP network services providers or carriers. Local Dialing Plan and Routing Rule Common Database Server 235 stores information of regionalized or localized dialing plans and emergency contact information for different cities and countries around the world. The local dialing plans include information about the number of digits that need to be dialed to complete a call within a particular region, country or city. The number of digits that need to be dialed may vary depending on the city, country, and region as well as the type of called endpoint device, such as wire line phones vs. cellular phones. The emergency contact information includes the local phone numbers for local emergency agencies.

For instance, Local Dialing Plan and Routing Rule Common Database Server 235 periodically collects local dialing plans and emergency contact phone numbers from Local Dialing Plan and Routing Rule Data Server 230 residing in Foreign Country Network 220 using flow 250.

Similarly, Local Dialing Plan and Routing Rule Common Database Server 235 periodically collects local dialing plans and emergency contact phone numbers from Local Dialing Plan and Routing Rule Data Server 231 residing in Foreign Country Network 221 using flow 251.

Similarly, Local Dialing Plan and Routing Rule Common Database Server 235 periodically collects local dialing plans and emergency contact phone numbers from Local Dialing Plan and Routing Rule Data Server 232 residing in Foreign Country Network 222 using flow 252. Local Dialing Plan and Routing Rule Common Database Server 235 consolidates all the collected local dialing plans and emergency contact phone numbers and stores them in a single common database.

When an in-country subscriber of Foreign Country Network 221 supported by BE 211 makes normal phone calls or emergency calls to endpoints located within Foreign Country Network 221, Local Dialing Plan and Routing Rule Common Database Server 235 will be consulted to obtain the local dialing plans and emergency contact phone numbers. Specifically, when subscriber 241 makes a local call or an emergency call to another endpoint located within Foreign Country Network 221, TA 242 sends a call setup message to CCE 213 using flow 261 to establish the call. Upon receiving the call setup message, CCE 213 determines that the call is originated by an in-country service subscriber and destined to a called party endpoint located in the same foreign country. CCE 213 then obtains the appropriate local dialing plan and emergency contact phone number information from Local Dialing Plan and Routing Rule Common Database Server 235 using flow 262 in order to complete the call setup.

When a network provider of Foreign Country Network 222 wants to provide VoIP network services to subscribers in Foreign Country Network 220 via a wholesale arrangement with the network provider of Home Country VoIP Network 210, the provider of Foreign Country Network 222 can obtain the local dialing plans and emergency contact phone number information from Local Dialing Plan and Routing Rule Common Database Server 235 using flow 265.

FIG. 3 illustrates a flowchart of a method 300 for providing in country phone numbers and routing rules in a common database in a packet network, e.g., a VoIP network, of the present invention. Method 300 starts in step 305 and proceeds to step 310.

In step 310, the method retrieves a list of foreign country local dialing plan and routing rule data servers that carry local dialing plans and emergency contact phone number information associated with their own countries and cities. The list of foreign country local dialing plan and routing rule data servers is retrieved by a Local Dialing Plan and Routing Rule Common Database Server.

In step 320, the method contacts the first foreign country local dialing plan and routing rule data server on the list to collect the latest local dialing plan and emergency contact phone number information. For example, the first foreign country local dialing plan and routing rule data server is contacted by the Local Dialing Plan and Routing Rule Common Database Server. The local dialing plans may include information about the number of digits that need to be dialed to complete a call within a particular region, country or city. The number of digits that need to be dialed may vary depending on the city, country, and region as well as the type of called endpoint device, such as wire line phones vs. cellular phones. The emergency contact information may include the local phone numbers for local emergency agencies.

In step 330, the method stores the collected local dialing plans and emergency contact phone number information associated with the foreign country in a common database. The collected local dialing plans and emergency contact phone number information is stored by the Local Dialing Plan and Routing Rule Common Database Server in the common database.

In step 340, the method checks if there are remaining local dialing plan and routing rule data servers to be contacted. If there are remaining local dialing plan and routing rule data servers on the list to be contacted, the method proceeds to step 350; otherwise, the method provides to step 370.

In step 350, the method contacts the next foreign country local dialing plan and routing rule data server on the list to collect the latest local dialing plan and emergency contact phone number information. For example, the next foreign country local dialing plan and routing rule data server is contacted by the Local Dialing Plan and Routing Rule Common Database Server.

In step 360, the method again stores the collected local dialing plans and emergency contact phone number information associated with the foreign country in the common database. The collected local dialing plans and emergency contact phone number information is stored by the Local Dialing Plan and Routing Rule Common Database Server in the common database. The method then proceeds back to step 340.

In step 370, the method makes the common database available to the network provider that operates the VoIP network in which the Local Dialing Plan and Routing Rule Common Database Server resides and one or more other wholesale service providers who are wholesale customers to the VoIP network in which the Local Dialing Plan and Routing Rule Common Database Server resides. The common database can be accessed by the network provider that operates the VoIP network in which the Local Dialing Plan and Routing Rule Common Database Server resides via a CCE. The common database can be accessed by a wholesale customer to the VoIP network in which the Local Dialing Plan and Routing Rule Common Database Server resides via an agreed upon communication interface. Method 300 ends in step 380.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing in country phone numbers and routing rules in a common database, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing in country phone numbers and routing rules in a common database can be loaded into memory 404 and executed by processor 402 to implement the functions as discussed above. As such, the present process 405 for providing in country phone numbers and routing rules in a common database (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing in country phone numbers and routing rules in a communication network, comprising:

collecting a plurality of local dialing plans and emergency phone numbers from a plurality of foreign country network service providers into a common database, wherein the plurality of local dialing plans comprises a number of digits to be dialed in a foreign region to reach a type of called endpoint device; and providing the common database for supporting call processing associated with a subscriber of the communication network, wherein the providing the common database comprises:

receiving by a call control element in the communication network a call setup message from the subscriber located in a foreign region to a called party endpoint located in the same foreign region, wherein the subscriber subscribes to an in-country service feature;

obtaining one of the plurality of local dialing plans or emergency phone numbers associated with the same foreign region in which the subscriber is located from the common database; and processing the call setup message using the one of the plurality of local dialing plans or emergency phone numbers.

2. The method of claim 1, wherein the communication network is an internet protocol network.

3. The method of claim 1, wherein the emergency phone numbers comprise local phone numbers for contacting local emergency agencies.

4. The method of claim 1, wherein the type of called endpoint device comprises a wire line telephone.

5. The method of claim 1, wherein the one of the plurality of local dialing plans or emergency phone numbers is obtained by the call control element from the common database.

6. The method of claim 1, wherein the type of called endpoint device comprises a cellular telephone.

7. A computer-readable medium having stored thereon a plurality of instructions, the plurality of instructions including instructions which, when executed by a processor, cause the processor to perform a method for providing in country phone numbers and routing rules in a communication network, comprising:
  collecting a plurality of local dialing plans and emergency phone numbers from a plurality of foreign country network service providers into a common database, wherein the plurality of local dialing plans comprises a number of digits to be dialed in a foreign region to reach a type of called endpoint device; and
  providing the common database for supporting call processing associated with a subscriber of the communication network, wherein the providing the common database comprises:
    receiving by a call control element in the communication network a call setup message from the subscriber located in a foreign region to a called party endpoint located in the same foreign region, wherein the subscriber subscribes to an in-country service feature;
    obtaining one of the plurality of local dialing plans or emergency phone numbers associated with the same foreign region in which the subscriber is located from the common database; and
    processing the call setup message using the one of the plurality of local dialing plans or emergency phone numbers.

8. The computer-readable medium of claim 7, wherein the communication network is an internet protocol network.

9. The computer-readable medium of claim 7, wherein the emergency phone numbers comprise local phone numbers for contacting local emergency agencies.

10. The computer-readable medium of claim 7, wherein the type of called endpoint device comprises a wire line telephone.

11. The computer-readable medium of claim 7, wherein the one of said plurality of local dialing plans or emergency phone numbers is obtained by the call control element from the common database.

12. The computer-readable medium of claim 7, wherein the type of called endpoint device comprises a cellular telephone.

13. An apparatus for providing in country phone numbers and routing rules in a communication network, comprising:
  means for collecting a plurality of local dialing plans and emergency phone numbers from a plurality of foreign country network service providers into a common database, wherein the plurality of local dialing plans comprises a number of digits to be dialed in a foreign region to reach a type of called endpoint device; and
  a call control element in the communication network for providing the common database for supporting call processing associated with a subscriber of the communication network, wherein the providing the common database comprises:
    receiving by the call control element a call setup message from the subscriber located in a foreign region to a called party endpoint located in the same foreign region, wherein the subscriber subscribes to an in-country service feature;
    obtaining one of the plurality of local dialing plans or emergency phone numbers associated with the same foreign region in which the subscriber is located from the common database; and
    processing the call setup message using the one of the plurality of local dialing plans or emergency phone numbers.

14. The apparatus of claim 13, wherein the communication network is an internet protocol network.

15. The apparatus of claim 13, wherein the emergency phone numbers comprise local phone numbers for contacting local emergency agencies.

16. The apparatus of claim 13, wherein the type of called endpoint device comprises a wire line telephone.

17. The apparatus of claim 13, wherein the type of called endpoint device comprises a cellular telephone.

* * * * *